(12) United States Patent
Kamada et al.

(10) Patent No.: US 6,192,258 B1
(45) Date of Patent: Feb. 20, 2001

(54) MOBILE COMMUNICATION DEVICE WITH A ROTARY PUSH SWITCH

(75) Inventors: Tomihisa Kamada; Koichi Hayasaka, both of Tokyo (JP)

(73) Assignees: Access Co., Ltd.; Sony Corporation, both of Tokyo (JP)

( * ) Notice: Under 35 U.S.C. 154(b), the term of this patent shall be extended for 0 days.

(21) Appl. No.: 09/083,580

(22) Filed: May 21, 1998

(30) Foreign Application Priority Data

May 23, 1997 (JP) .................................................. 9-150509

(51) Int. Cl.[7] ...................................................... H04M 1/00
(52) U.S. Cl. ............................................. 455/566; 455/564
(58) Field of Search ................................... 455/564, 566, 455/90, 550, 575

(56) References Cited

U.S. PATENT DOCUMENTS

| 5,703,947 | * | 12/1997 | Hino et al. ........................... 455/575 |
| 5,719,936 | * | 2/1998 | Hillenmayer ......................... 455/575 |
| 5,832,079 | * | 11/1998 | Rabe .................................... 455/550 |
| 5,896,575 | * | 4/1999 | Higginbotham et al. ............ 455/566 |
| 5,933,783 | * | 8/1999 | Kawakami et al. .................. 455/550 |
| 5,987,336 | * | 11/1999 | Sudo et al. ........................... 455/566 |

* cited by examiner

Primary Examiner—Nay Maung
Assistant Examiner—Quochien B. Vuong
(74) Attorney, Agent, or Firm—Dellett and Walters

(57) ABSTRACT

A mobile communication device with a flat display of relatively large screen size, capable of displaying an HTML document, to enhance its operability. A personal information list written in HTML is present on the display. Anchor points are set to person names, phone numbers, FAX numbers and e-mail addresses in the list. Selection of these items with a pen causes their associated operations to be performed. The person names and their phone numbers of the list appear within a display window of the device with its cover closed. With respect to the anchor points other than those to the phone numbers, a special character string "KEYSKIP" is set in each start tag of the anchor points. A browser sequentially moves a focus among the anchor points in response to the rotating operation of a rotary push switch. In this processing, the browser will skip the focusing of the anchor points that has the "KEYSKIP" attribute added. A push operation of the rotary push switch with respect to the focussed anchor point will activate an automatic dialing to the phone number of the focussed anchor point.

16 Claims, 15 Drawing Sheets

FIG. 3A

HTML DOCUMENT   "aaa.html"

FIG. 3B

```
<HTML>
 <HEAD>
 <TITLE>TITLE</TITLE>
 </HEAD>
 <BODY>
  This is a body part.
  .....
 <A HREF="bbb.html">BBB</A>
  ...

<A HREF="ccc.html"><IMAG
 SRC="ggg.gif"></A>
  ...

</BODY>
 </HTML>
```

BROWSER IMAGE

TITLE

This is a body part.
.....
BBB
...

IMAGE 203
204
201
202

FIG.5A
LINK TO ANOTHER LOCATION IN THE SAME FILE
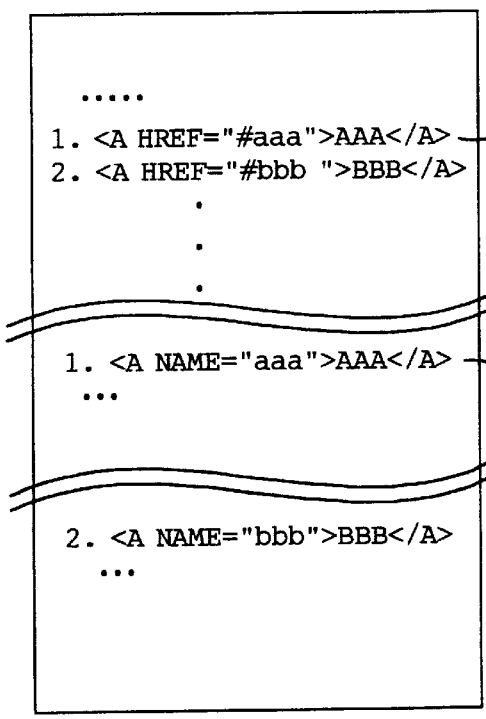
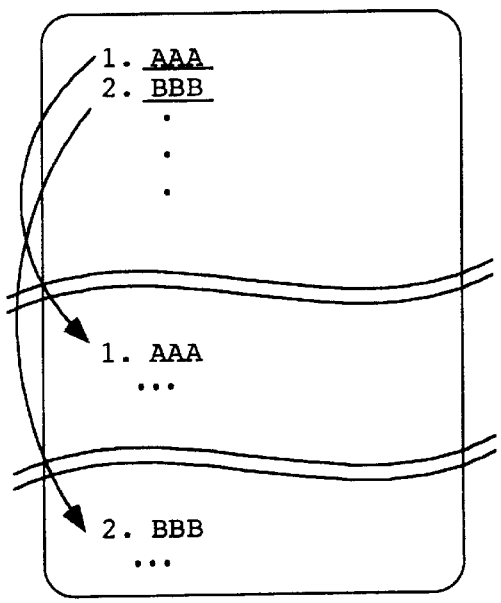

FIG.6A
LINK TO PARTICULAR LOCATION OF ANOTHER FILE IN THE SAME SERVER
LINKED SOURCE FILE "aaa.html"     LINKED DESTINATION FILE "bbb.html"
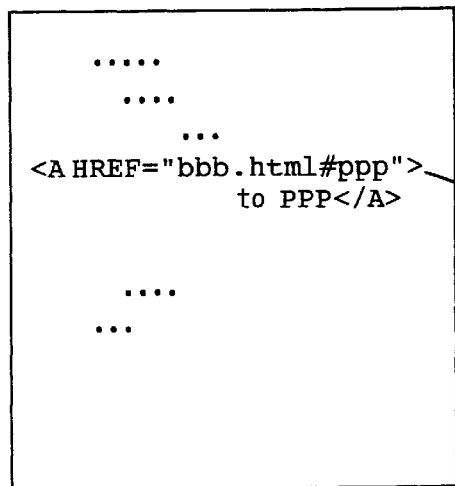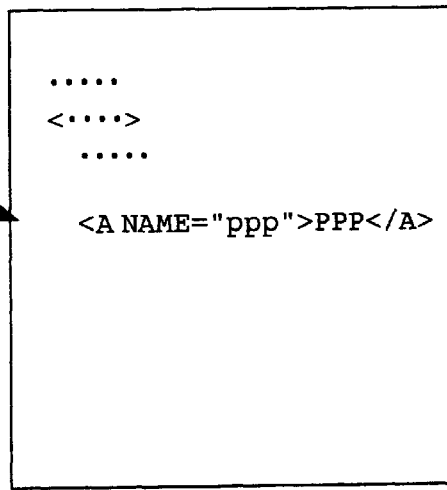
FIG.6B
BROWSER IMAGE OF "aaa.html"     BROWSER IMAGE OF "bbb.html"
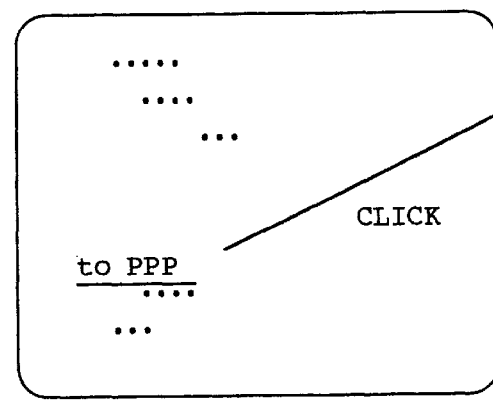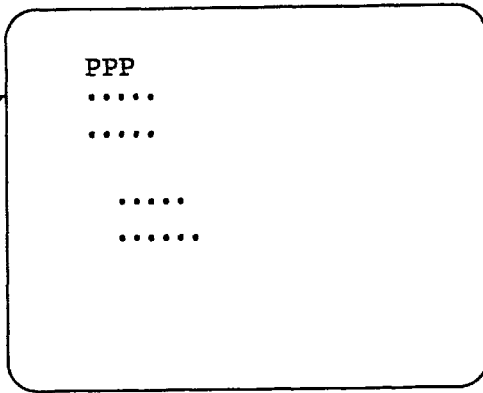

FIG. 7

| | NAME | TEL | FAX | E-mail |
|---|---|---|---|---|
| 1. | 安藤 一郎 | 012-345-6789 | 012-345-6780 | ando@*******.co.jp |
| 2. | 石田 一郎 | 050-123-4567 | 050-123-4568 | ishida@*******.co.jp |
| 3. | 内田 二郎 | 012-345-6798 | 012-345-6799 | uchida@*******.co.jp |
| 4. | 遠藤 四郎 | 050-123-4500 | 050-123-4501 | endo@*******.co.jp |
| 5. | 大西 五郎 | 012-345-6700 | 012-345-6701 | ohnishi@*******.co.jp |
| 6. | 片岡 六郎 | 050-123-4560 | 050-123-4561 | kataoka@*******.co.jp |
| 7. | 岸田 七郎 | 012-345-7800 | 012-345-7801 | kishida@*******.co.jp |
| 8. | 工藤 八郎 | 050-123-8900 | 050-123-8901 | kudoh@*******.co.jp |

FIG. 8

| NAME | 安藤 一郎 |
| KANA | あんどう いちろう |
| ADDRESS | 〒101 東京都千代田区・・・ |
| COMPANY | ○○○株式会社 |
| TEL | 012-345-6789 |
| FAX | 012-345-6780 |
| E-mail | ando@*******co.jp |
| NOTE | |

EDIT  DELETE  BACK

800

71a — <A HREF="1st.html" KEYSKIP>[1:1st Select]</A>
. . .
72a — <A HREF="2nd.html" >[2:2nd Select]</A>
. . .
73a — <A HREF="3rd.html" KEYSKIP><IMG SRC="imageA.gif"></A>
. . .
74a — <A HREF="4th.html" ><IMG SRC="imageB.gif"></A>

FIG.14

```
<TABLE WIDTH="XXX" BORDER="1" CELLSPACING="2" CELLPADDING="0">
<TR>
<TD NOWRAP WIDTH="XXX">
<A HREF="contact.html#AndoIchiro" KEYSKIP>
1、安藤 一郎
</A>
</TD>
<TD NOWRAP WIDTH="XXX">
<A HREF="phoneto:012-345-6789">
012-345-6789
</A>
</TD>
<TD NOWRAP WIDTH="XXX">
<A HREF="faxto:012-345-6780" KEYSKIP>
012-345-6780
</A>
</TD>
<TD NOWRAP WIDTH="XXX">
<A HREF="mailto:ando@********co.jp" KEYSKIP>
ando@********co.jp
</A>
</TD>
```

91 — first TD block
92 — second TD block
93 — third TD block
94 — fourth TD block

MOBILE COMMUNICATION DEVICE WITH A ROTARY PUSH SWITCH

BACKGROUND OF THE INVENTION a. Field of the Invention

The present invention generally relates to a mobile communication device capable of a wireless communication, such as a so-called mobile telephone (or cellular phone), a personal handy phone system (PHS), etc., and particularly to such devices having a flat display of a relatively large size.

b. Related Art

In recent years, mobile communication devices such as a mobile telephone and a PHS are widely spread while the number of users of mobile PCs and personal digital assistants (PDAs) are rapidly increasing. In this connection, it becomes possible to perform a data communication outdoors or at an outside site with any desired person by connecting the mobile PC with the mobile communication device.

A product has recently been commercialized in which the two devices are integrated, i.e., a mobile communication device in the form of a PHS telephone with a PDA capability. This product could also be considered as a mobile information device in which a PDA is provided with a PHS capability.

This type of mobile communication devices are available for a person at a place other than his or her home or office not only for simply as a telephone but also for transmitting/receiving e-mails and facsimiles, or accessing Internet WWW (world Wide Web) servers to browse home-pages.

For this end, such mobile communication devices include a display of a larger screen size than that of conventional mobile telephones.

In making a phone call, the dialing can be performed not only by pressing numeral keys, but also based on the phone number of a person selected from a telephone directory data, which is stored in the device, without the key entering of the phone number.

On the other hand, information of home-pages obtained from the WWW servers is written in Hyper Text Markup Language (HTML). A document written in HTML, itself, is a text file in which codes sandwiched by symbols "<" and ">", called tags, are used to specify character-attribute information or layout information. A program called a "browser" interprets the tags so as to display the HTML document.

An HTML document can have other text, image or audio inserted therein, and also have parts thereof linked with images or other HTML documents. That is, in HTML documents, a location (i.e., an anchor point or hot-spot explained below) in a document can be linked (or correlated) with another location or a separate file, etc. This enables an immediate movement from a location to another location of a linked destination, allowing the effective browsing of a variety of documents (including so-called multi-media). In addition, it is possible, based on a selection of an anchor point, to open a window for sending an electronic mail (e-mail) or to activate a particular function that is associated with the anchor point.

Thus, anchor points set in an HTML document with respect to various items therein allow a user to select them so as to view other documents or activate various functions which are associated with the selected anchor points.

Incidentally, most of the portable information devices such as a PDA are provided with pens, which are used as a pointing device to directly enter commands through a touch panel on a display of the device.

However, when using the mobile communication device simply as a telephone, it is bothersome to use the pen each time a user specifies one of the phone numbers in a telephone directory. Usually, therefore, motion keys are used for selectively indicating two directions to search a phone number. For example, phone numbers with anchor points set in a telephone directory written in HTML can sequentially be designated by the use of the motion keys or the like. The browser can recognize the position of the anchor points so that for selecting one anchor point based on the motion key operation, the anchor points are sequentially designated one by one simply by indicating a forward direction or a backward direction with the keys. Such designation of an anchor point is referred to as a "focus" in the specification. Also, the position of an anchor point that is currently focussed in a displayed HTML document is referred to as a "focussed" position. An operation to cause an execution of a particular function or a jump associated with such focussed anchor point is referred to as a "selection. The "selection" is distinguished from the "designation" which is a step taken prior to the selection.

In the above-mentioned mobile communication device with a PDA capability, it is preferable to include in the telephone directory not only names and telephone numbers but facsimile numbers or e-mail addresses, etc. Further, with the telephone directory being an HTML document, the additional items can be provided with various functions as described above.

However, in such a case where anchor points are set to various items in the HTML document, the designation of an anchor point by the use of the motion keys mentioned above suffers from a problem in which it is difficult to quickly find a desired telephone number because a lot of undesired anchor points could be encountered until an anchor point of the desired number is reached.

The present invention was made in view of the foregoing problem, and it is an object of the invention to enhance the operability of a mobile communication device with a flat display of a relatively large screen size, capable of displaying thereon an HTML document.

It is another object of the invention to provide a mobile communication device with a rotary push switch, in which a desired anchor point for automatic dialing is quickly reached in response to an operation for moving a focus.

SUMMARY OF THE INVENTION

According to an aspect of the present invention, there is provided a mobile communication device, comprising: a flat display; a display means for displaying a document including personal information in which an anchor point is set to a particular item of the personal information; a switch capable of two-way retrieve operations as well as a push operation; a focus moving means for sequentially moving, on the flat display, a focus among a plurality of anchor points in the document in a forward direction according to one of the retrieve operations of the switch and in a backward direction according to the other of the retrieve operations; a selection means for selecting a currently-focussed one of the anchor points according to the push operation of the switch; the focus moving means skipping anchor points that have a focus skipping attribute added, without focussing on those anchor points, when moving the focus among the anchor points in a forward or backward direction according to the retrieve operation of the switch.

With this arrangement, it is possible to restrict the anchor points to be focussed on in response to the two-way retrieve operations of the switch, allowing a quick movement of the focus to a target anchor point. Therefore, the operability of the device is enhanced.

According to another aspect of the present invention, there is provided a mobile communication device, comprising a flat display; a display means for displaying on the flat display an HTML document including personal information with a particular item to which an anchor point for automatic dialing is set; a rotary push switch capable of clockwise and counter-clockwise rotating operations as well as a push operation; a focus moving means for sequentially moving, on the flat display, a focus among a plurality of anchor points in the HTML document in a forward direction according to one of the clockwise and counter-clockwise rotating operations of the rotary push switch and in a backward direction according to the other; a selection means for selecting a currently-focussed one of the anchor points according to the push operation of the rotary push switch; the focus moving means skipping anchor points to which a focus skipping attribute is added, without focussing on those anchor points, when moving the focus among the anchor points in a forward or backward direction according to the clockwise or counter-clockwise rotating operation.

Also, with this arrangement, it is possible to restrict the anchor points to be focussed on in response to the rotating operation of the rotary push switch, allowing a quick movement of the focus to a target anchor point.

Preferably, in order to adapt the (rotary push) switch to the telephone function, the focus skipping attribute is added to the anchor points other than those for automatic dialing.

In an HTML document which includes anchor points for performing a variety of functions, the addition of such an attribute only to the anchor points other than those for automatic dialing causes the focus moving means to skip the focussing on the anchor points other than those for automatic dialing when moving the focus according to the rotating operation of the rotary push switch. As a result, the focus is sequentially placed on only the anchor points for automatic dialing, making it possible to quickly reach a target anchor point.

Preferably, the device further comprises an automatic dialing means for automatically making a phone call to a specified phone number upon selection of the anchor point for automatic dialing by the push operation of the rotary push switch. Thus, with a single switch, one can designate and select a phone number, followed by the automatic dialing of the phone number, thereby further improving the operability of the device.

In addition, the mobile communication device preferably comprises a touch panel, which is overlaid on the screen of the flat display, and a pointing means for pointing any point on the touch panel. The anchor point selection means selects even an anchor point having the focus skipping attribute when the anchor point is pointed with the pointing means. This enables the selection of anchor points that cannot selected with the rotary push switch.

Preferably, the device includes a cover with a display window which exposes, in its closed state, a part of the screen of the flat display, and the display means displays, in the closed state, at least the particular item of the HTML document within the display window. This allows a user to use the mobile communication device, when used as a telephone, in the same or similar manner to the conventional telephones.

In this case, it is desirable to provide a detection means for detecting the closed state of the cover, while the display means moves an image displayed on the flat display such that necessary information appears in the display window. Thus, in the closed state of the cover, only necessary portion of the entire information on the large screen of the flat display is shown within the display window.

Alternatively, there may be provided a detection means for detecting the closed state of the cover. When the closed state is detected by the detection means the display means acts to rotate the image on the flat display by 90 degrees so that when a user holds the device vertically in his or her hand it becomes easy to view the image in the display window.

According to a further aspect of the invention, there is provided a method for moving a focus among a plurality of anchor points in a document which is displayed on a display of a mobile communication device, the document including personal information in which the anchor points are set at least to an item of the personal information, the device including a switch capable of two-way retrieve operations as well as a push operation, the method comprising the steps of: displaying the document on the display; sequentially moving, on the display, the focus among the plurality of anchor points in the document in a forward direction according to one of the retrieve operations of the switch and in a backward direction according to the other of the retrieve operations; and selecting a currently-focussed one of the anchor points according to the push operation of the switch; the step of sequentially moving including a step of skipping anchor points that have a focus skipping attribute added, without focussing on those anchor points, when moving the focus among the anchor points in a forward or backward direction according to the retrieve operation of the switch.

According to yet another aspect of the invention, there is provided a method for moving a focus among a plurality of anchor points in an HTML document which is displayed on a display of a mobile communication device, the HTML document including personal information in which an anchor points for automatic dialing is set to a particular item of the personal information, the device including a rotary push switch capable of clockwise and counter-clockwise rotating operations as well as a push operation, the method comprising the steps of: displaying the HTML document on the display; sequentially moving, on the display, the focus among the plurality of anchor points in the HTML document in a forward direction according to one of the clockwise and counter-clockwise rotating operations of the rotary push switch and in a backward direction according to the other; selecting a currently-focussed one of the anchor points according to the push operation of the rotary push switch; the step of sequentially moving including a step of skipping anchor points that have a focus skipping attribute added, without focussing on those anchor points, when moving the focus among the anchor points in a forward or backward direction according to the clockwise or counter-clockwise rotating operation of the rotary push switch.

The invention will be more clearly understood from the following description of embodiments thereof given by way of example only, with reference to the accompanying drawings.

BRIEF DESCRIPTION OF THE DRAWINGS

FIG. 3A shows an HTML document;

FIG. 3B shows a browser image corresponding to the HTML document of FIG. 3A;

FIG. 5A shows an HTML document for explanation of another type of link in the HTML document;

FIG. 5B shows a browser image corresponding to the HTML document of FIG. 5A;

FIG. 6A shows an HTML document for explanation of yet another type of link in the HTML document;

FIG. 6B shows a browser image corresponding to the HTML document of FIG. 6A;

FIG. 7 shows an example of a list of personal information registered in an application of the present invention, in the form of an HTML text;

FIG. 8 shows an example of image which is displayed when an anchor point of a person name in the HTML document of FIG. 7 is selected;

FIG. 14 shows a part of an exemplary description of an HTML document which corresponds to the personal information list of FIG. 7.

DETAILED DESCRIPTION OF THE PREFERRED EMBODIMENTS

First, as a prerequisite for a better understanding of the invention, an explanation will be given of the structure of an HTML document.

Referring to FIG. 3, there is shown a basic configuration of an HTML document. The HTML document is, as mentioned above, substantially a text file and has embedded codes called tags (each defined by symbols "<" and ">") placed in the document. Usually, a pair of start and end tags sandwich a specified area in the text. The end tag has "/" therein to be distinguished from the start tag. However, some tags are used alone, such as a paragraph tag <P> and a line break tag <BR>. With such tags, character attribute information and layout information as well as link information can be defined. These tags are interpreted by a browser so as to construct an image of the HTML document on the display in the form as intended by the creator of the document, and also to control the linking.

As shown in FIG. 3A, the basic structure of an HTML document includes various tags placed in a text document. When this HTML document is interpreted and displayed on a screen, the tags are not displayed but only their indications influence the display, as seen from FIG. 3B. When an anchor point set to a particular character string in the HTML document is selected by a user, a jump to a location associated with the character string will take place. This function is called a "link". In FIG. 3A, at location 201 the HTML document "aaa.html" reads:

<A HREF="bbb.html">BBB</A>

The tags for defining a link (<A . . . >. . . </A>) are called "anchor tags". The part sandwiched by the anchor tags is called an "anchor point" or "hot spot". The term "HREF=" in the start tag of the anchor tag <A HREF="bbb.html"> is used to specify information for accessing a linked destination (here, a file name). This part between the anchor tags are emphasized on a browser screen as shown in FIG. 3B, in which displayed character string "BBB" 203 are emphasized. This emphasis may be performed by changing the color of the character string or underlining it. This allows a user to recognize that when a user selects or clicks the character string, he or she will be led to another location which is linked with the character string.

Also, at location 202 (FIG. 3A) is an anchor point that is set to an inline image. Here, an image file named "g gg.gif" is displayed as an image 204 (FIG. 3B) wherein when the image 204 is selected by a user, a linked destination file "ccc.html" is read out and displayed. The "inline image" is referred to as an image that is embedded in an HTML document to be displayed.

Regarding the link, information for accessing a linked destination is classified into the following several types.

Figure 4A:
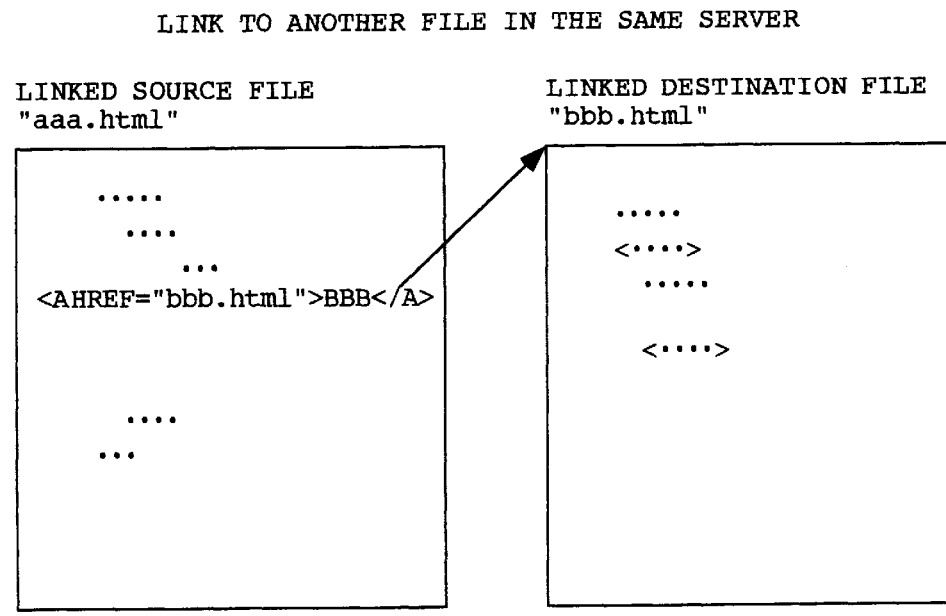
FIG. 4A shows an HTML document for explanation of a link in the HTML document.
Figure 4B:
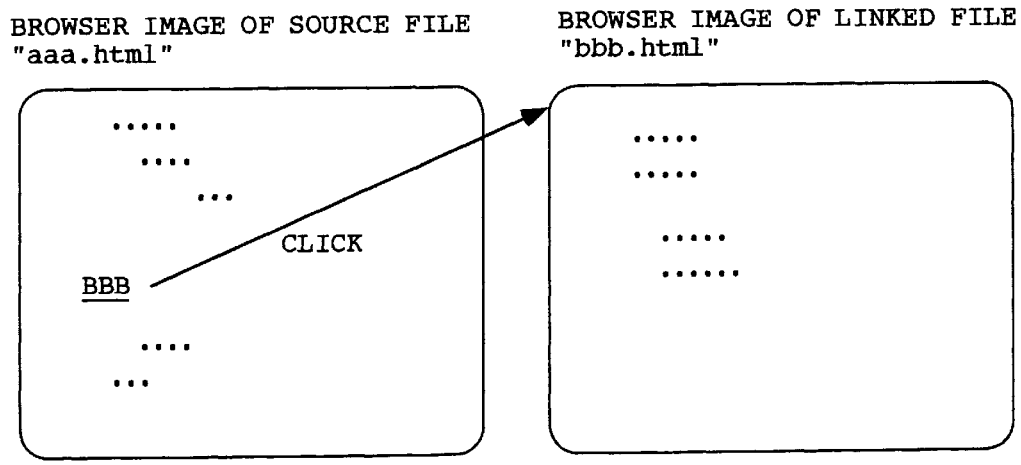
FIG. 4B shows a browser image corresponding to the HTML document of FIG. 4A.

As shown in FIGS. 4A and 4B, when a link is set from an HTML file in a server (host) to another HTML file in the same server, the file name (sometimes together with a directory name) of the latter is the information that indicates the linked destination. FIG. 4A shows a relationship between a linked source HTML file and a linked destination HTML file. FIG. 4B shows how the browser images are displayed corresponding to the respective files. In this example, when an anchor point, character string "BBB", is selected, another file or linked destination HTML file "bbb.html" is requested and its content is displayed.

Referring to FIGS. 5A and 5B, there could be a case where a link is set from a location in a file to another location in the same file. In such a case, an item name of the location is used as information that indicates a linked destination. As shown in FIG. 5A, in this example, at the linked source the description 52 of <A HREF="#aaa">AAA</A> indicates a linked location, while at the linked destination the description 53 of <A NAME="aaa">AAA</A> indicates that the link is set to the item name "aaa". As seen from FIG. 5B, the corresponding browser image includes an emphasized character string "AAA". When this character string is selected by a user, the display will jump to an item "AAA" at the subsequent location in the same file. This addressing is effective particularly in a case where a page is lengthy and a list of item names is raised at the beginning of the page, linking the item names with the subsequent corresponding locations.

Referring to FIGS. 6A and 6B, there could be a case where a link is set from a file to a particular location of another file in the same server. In such a case, a combination of the file name of the latter file and the name of an item in the document is used as information that indicates a linked destination. In this example, a jump takes place to an item "ppp" of another file "bbb.html" in the same server. FIG. 6A shows a relationship between a linked source HTML file and a linked destination HTML file. FIG. 6B shows browser images corresponding to the respective HTML files.

Further, as stated below, it is possible to set a special command in the start tag so that when the anchor point is selected a script (program) corresponding to the special command is called and executed.

Figure 1A:
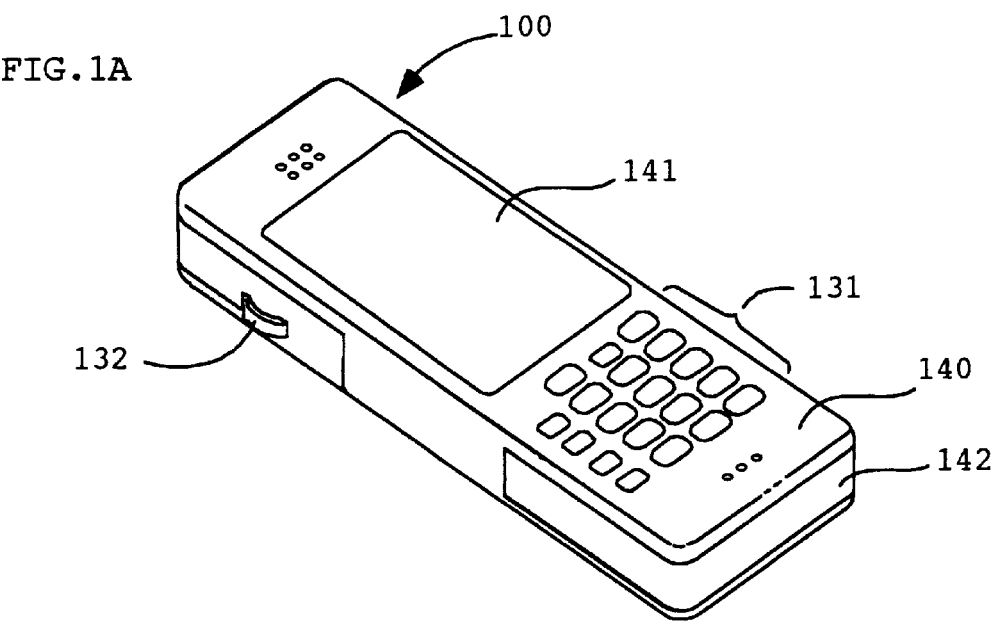
FIG. 1A shows a perspective view of a telephone as an example of a mobile communication device with a rotary push switch according to the present invention.
Figure 1B:
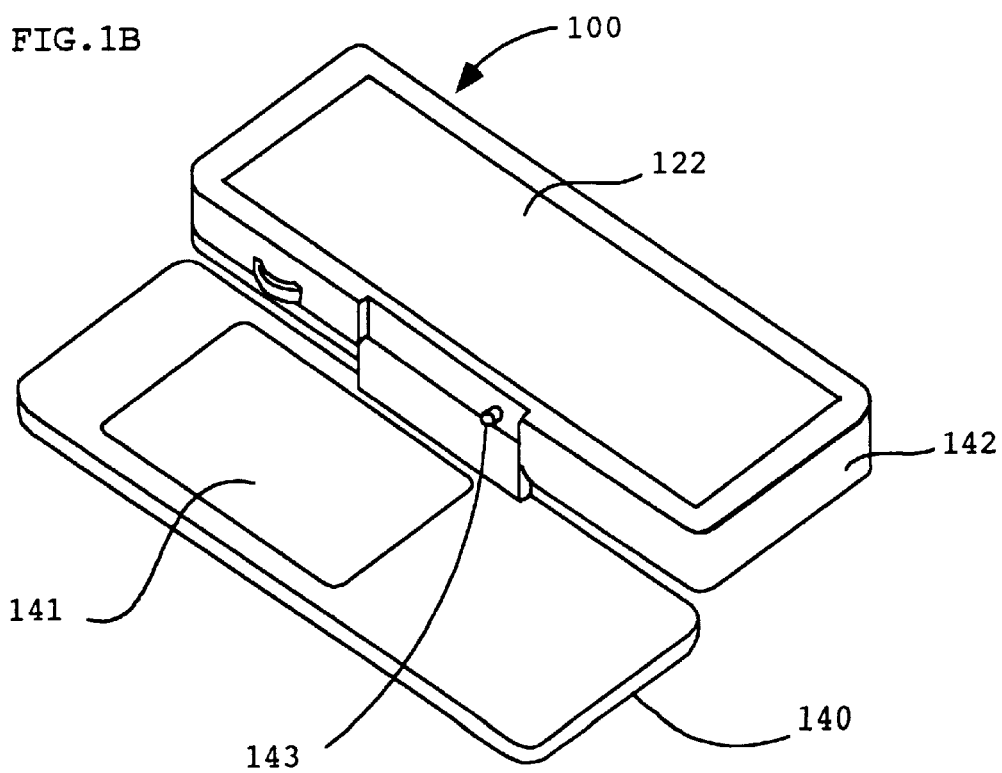
FIG. 1B shows the telephone of FIG. 1 with its cover in an opened state.

Referring next to FIGS. 1A and 1B, there are shown perspective views of a telephone 100 as a mobile communication device according to the present embodiment. Here, this example is directed to a PHS phone with a data transmission capability. FIG. 1A shows a telephone 100 with its cover 140 closed, and FIG. 1B shows it with the cover 140 opened. As seen from FIG. 1A, the cover 140 is provided with a display window 141 and various keys 131 such as numeral buttons. A main body 142 has a flat display 122 (e.g., liquid crystal panel) of a relatively large screen size extended substantially over the entirety of the main body 142 at the area covered by the cover 141. Although not clearly seen from the FIG., the face of the flat display 122 is overlaid with a touch panel. Disposed at the upper left side of the main body 140 is a rotary push switch 132 called a "jog dial". The rotary push switch 132 is capable of clockwise and counter-clockwise rotating operations as well as a push operation. More specifically, the switch 132 comprises an encoder which includes a rotary disk-like member rotatable 360 degrees endlessly along a vertical direction (longitudinal direction of the main body 140), with click feeling at regular intervals in angle. The rotation of the disk-like member together with the rotational direction are detected at the regular intervals in rotation angle. The disk-like member also serves as a push switch capable of being depressed toward the main body 140. Such a rotary push switch 132, per se, is known in its structure and function, and hence, no further explanation is given here. In the embodiment, the rotary push switch 132 is used for designation and selection of a phone number, as described below.

Figure 2:
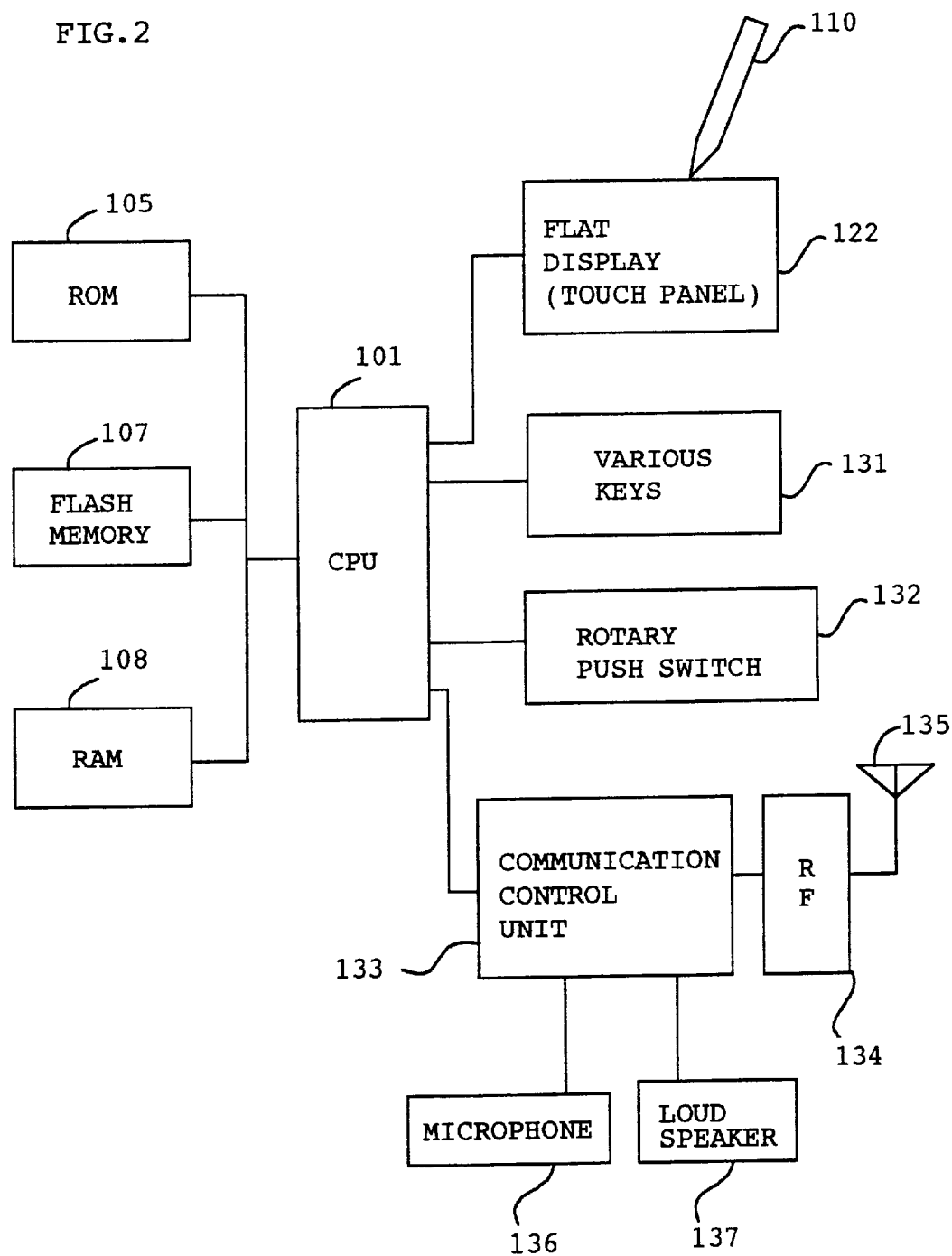
FIG. 2 is a block diagram showing a schematic hardware view of the telephone of FIG. 1.

Referring to FIG. 2, there is shown a hardware configuration of the telephone 100 of FIG. 1.

In the configuration shown in FIG. 2, a central processing unit (CPU) 101 serves to control the entire operation of the telephone 100. The CPU 100 is interconnected with a read only memory (ROM 105, a flash memory 107, a random access memory (RAM) 108, a flat display 122, various keys 131, a rotary push switch 132 and a communication control unit 133.

The ROM 105 is a non-volatile memory for a read only purpose and stores a variety of computer programs and necessary data. The programs include a browser whose function is extended according to the present invention. The flash memory 107 is a rewritable non-volatile memory and used to store personal management information of a personal information manager (PIM), uniform resource locators (URLs), e-mail addresses, etc which a user wishes to retain in a non-volatile manner. The flash memory 107 may also be used to store programs whose version is to be updated. The RAM 108 provides a temporary storage area, a work area and an area for storing various parameters for use in executing the programs.

A user can point an arbitrary coordinate point, with a pen 110, on the screen of the flat display 112 through the touch panel, although not clearly shown in FIGS. 1A and 1B. Preferably, the pen 110 is, when not used, stored in a storage space (not shown) which is provided in the main body 140 of FIG. 1. The various keys 131 and the rotary push switch 132 are as described above.

The communication control unit 133 is a part that controls communication in voice and data, connected via an RF unit 134 to an antenna 135, and also connected with a microphone 136 and a loud speaker 137.

The display means, focus moving means and anchor point selection means are realized mainly by the CPU 101 which executes the programs stored in the ROM 105 (or flash memory 107).

It should be noted that FIG. 2 shows a general configuration of the device and omits details such as a display memory, a display controller, an I/O control unit, etc.

In the embodiment, the personal information (personal management information) stored in the flash memory or the like is converted into an HTML text for display, and then the browser displays it as a telephone directory.

FIG. 7 shows an example of a list of registered personal information in the form of an HTML text. The displayed list of personal information is written with the table-related tags of HTML. This example of a personal information list includes items of a person's name (NAME), a telephone number (TEL), a facsimile number (FAX) and an electronic mail address (E-mail). As described below, an anchor point is set to each item of each person, to which a corresponding operation or function is pre-assigned to be performed.

In the personal information list of FIG. 7, for example, when the anchor point of a person name is selected with a pen, a screen 800 as shown in FIG. 8 is displayed which shows detailed information of that person. In this example of FIG. 8, his or her address, company name and note are shown in addition to the information contained in the list of FIG. 7. On this screen, it is possible to edit and delete the personal information. In order to register information of a new person, another screen (not shown) for that purpose is displayed from a menu (not shown).

Figure 9:
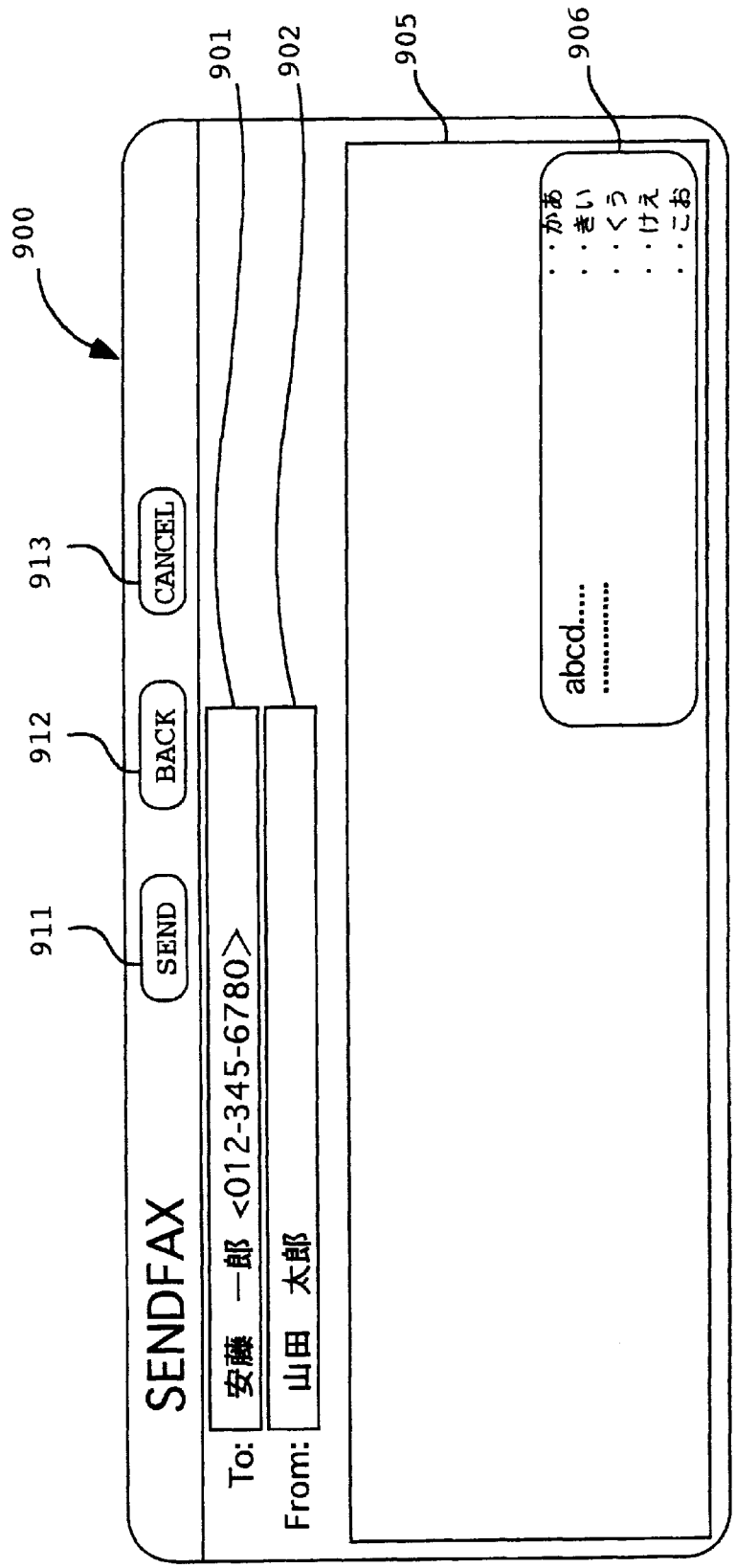
FIG. 9 shows an example of image which is displayed when an anchor point of a FAX number in the HTML document of FIG. 7 is selected.

Also in the personal information list of FIG. 7, when the anchor point of a person's FAX number is selected with a pen, a screen 900 as shown in FIG. 9 is displayed. In "To" area 901 on the screen 900, the FAX number of the selected person has automatically been set based on the personal information list of FIG. 7. In "From" area 902 on the screen 900, a pre-registered name of the user has automatically been set. The user name and the selected person's name will be added to the message in the body part (mentioned below) of the facsimile, or used as the sender information to be recorded on the FAX. In a body part area 905 on the screen 900, the user can input any massage by using a software keyboard 906 which is displayed on a part of the screen 900. The user can also hand-write characters or line drawings by using the pen. Upon user's selection of a SEND button 911 after filling the blank areas, the header and the content of the body part are transmitted to the FAX machine of the destination. If a CANCEL button 913 is selected before the selection of the SEND button, the input data are cancelled for re-input. A BACK button 912 leads the user to the list display of FIG. 7.

Figure 10:
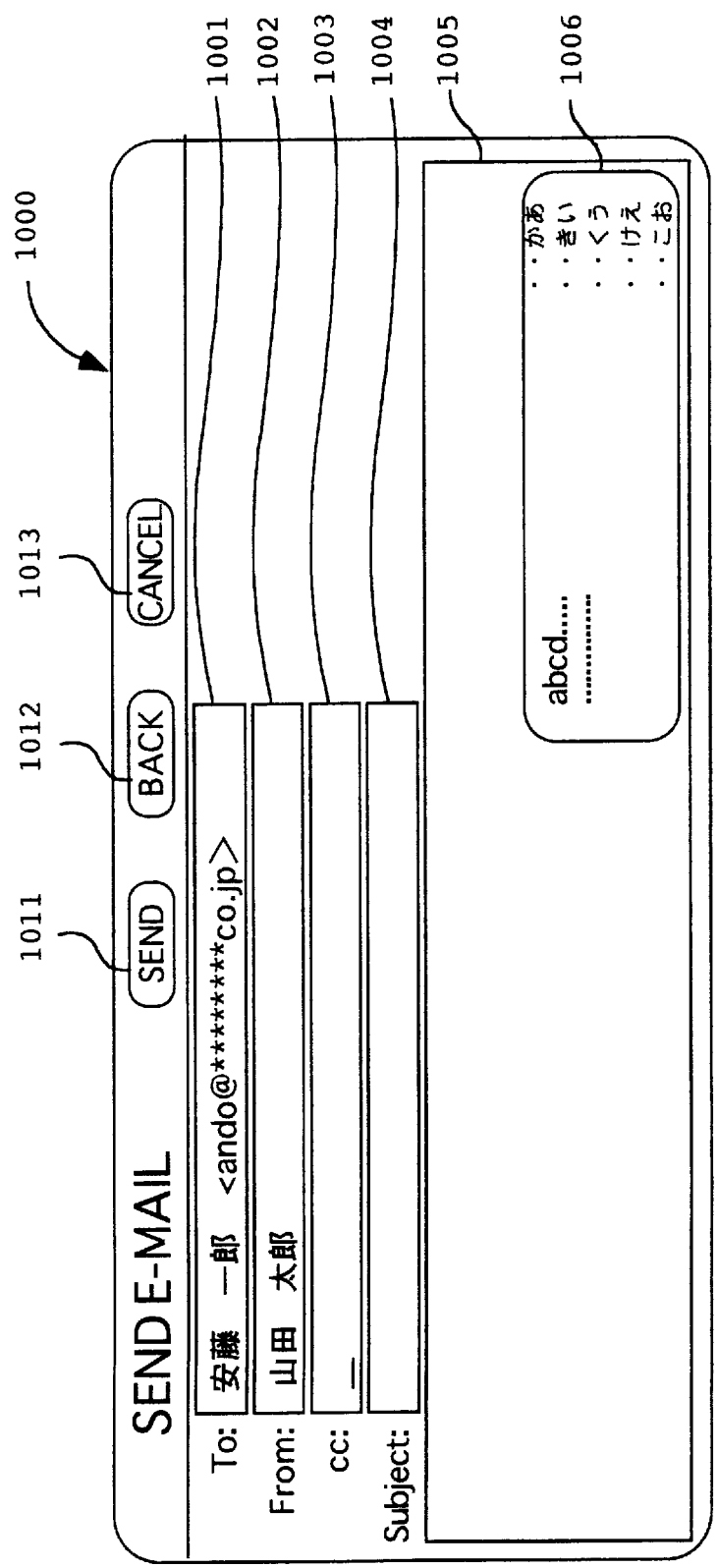
FIG. 10 shows an example of image which is displayed when an anchor point of an electronic mail address in the HTML document of FIG. 7 is selected.

Similarly, when the anchor point of a person's e-mail address in the personal information list of FIG. 7 is selected with a pen, a screen 1000 for sending an e-mail is displayed as shown in FIG. 10. In "To" area 1001 on the screen 1000, the e-mail address of the selected person has automatically been set based on the personal information list of FIG. 7. Also, in "From" area 1002, the pre-registered name of the user has automatically been set. In "cc" area 1003, the user can enter a character string representative of a person for carbon copy by using a software keyboard 1006. In "Subject" area 1004, the user can also enter a character string representative of a subject of the FAX message by using the software keyboard 1006. In a body area 1005, the user can input any text message with the software keyboard 1006. When the user selects a "SEND" button 1011 after filling necessary blank areas, an e-mail of the content of the screen 1000 is transmitted to the e-mail address of the destination. If a CANCEL button 1013 is selected before the selection of the SEND button 1011, the input data are cancelled for re-input. A BACK button 1012 leads the user back to the list display of FIG. 7.

Figure 11:
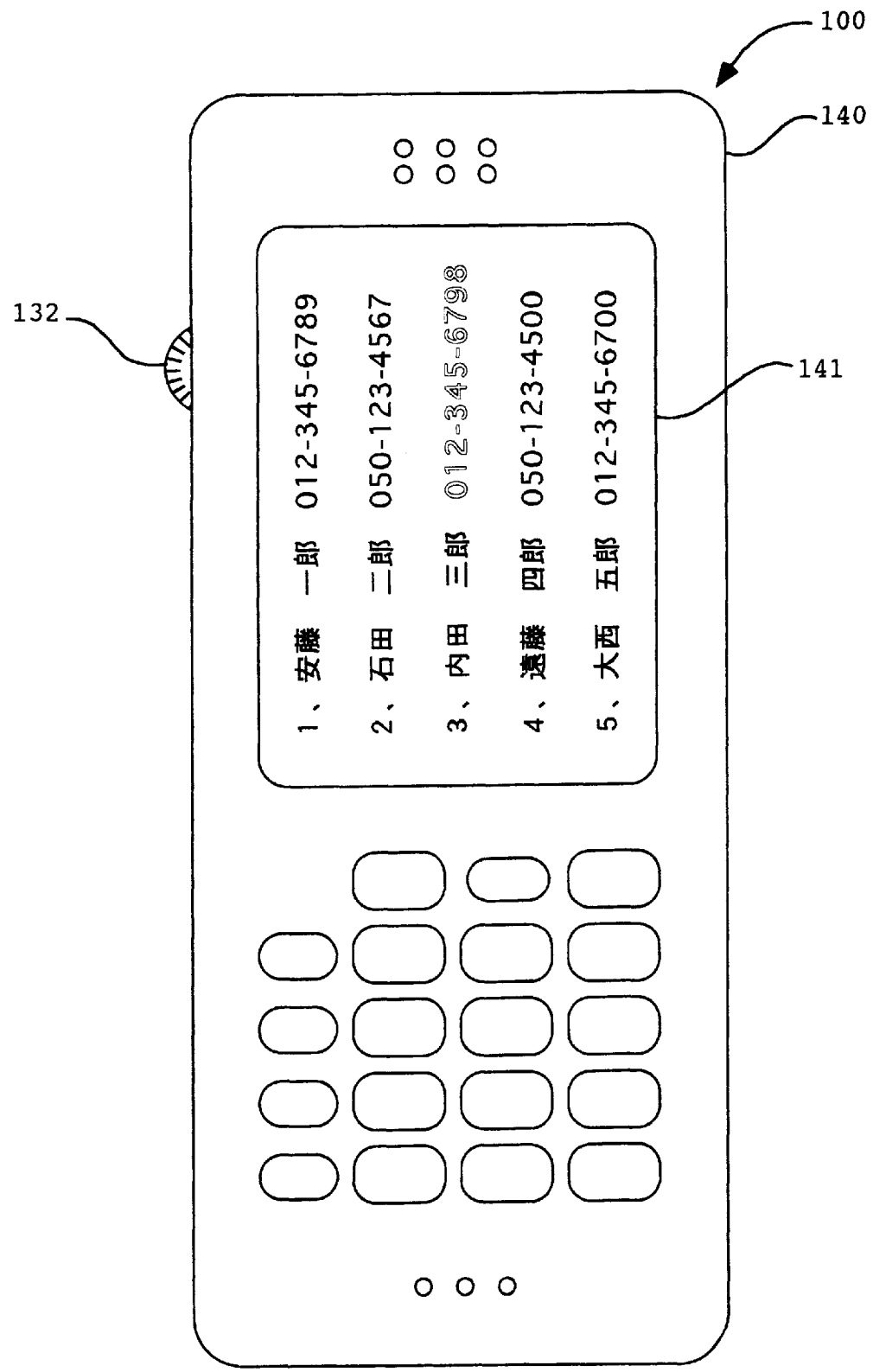
FIG. 11 shows an example of image which appears in a display window of the telephone of FIG. 1, with its cover closed.

Further, when the anchor point of a phone number in the personal information list of FIG. 7 is selected, an automatic dialing to the number will be carried out. It is usually assumed that this telephone function is used with the cover 140 closed. In the present embodiment, as shown in FIG. 11, a part of the screen of the flat display 122 is seen through the display window 141 in the closed state of the cover 140. In this regard, the image may be shifted or scrolled as needed so that at least the person names and their phone numbers appear in the display window 141. The amount of the shift may be fixed because the amount is known in advance. The shifting operation is not needed if necessary items of the whole information shown on the display are seen entirely from the window 141 in the closed state of the cover 140. In the example shown in FIG. 11, a focus is placed on the phone number of the third person, "Sabura Uchida Z1".

Figure 12:
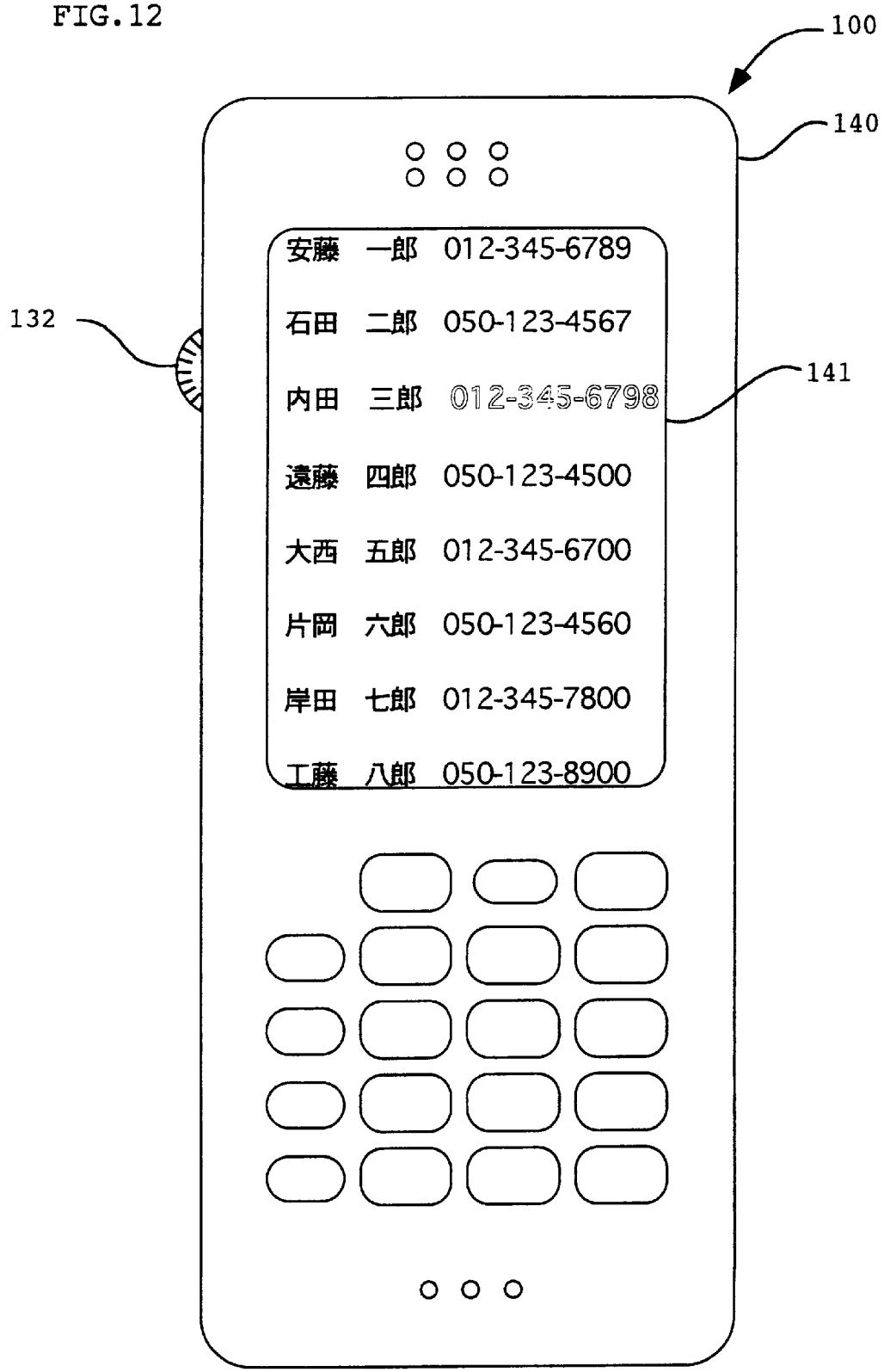
FIG. 12 shows another example of image which appears in a display window of the telephone of FIG. 1, with its cover closed.

Alternatively, as shown in FIG. 12, the image on the flat display 122 may be rotated to the right by 90 degrees so that it becomes easy to view the image when the telephone 100 is vertically held in a hand. Also, in this case of rotating the image 90 degrees, the display position may automatically be adjusted so that al least the person names and their phone numbers of the personal information list of FIG. 7 appear within the display window 141.

In order to detect the closed state of the cover 140, a microswitch is provided as shown in FIG. 1B. However, the present invention is not limited to the use of the microswitch if any other means is present to recognize the opened/closed state of the cover 140.

In the state as shown in FIGS. 11 and 12 where the person names and phone numbers are seen from the display window 141, when the rotary push switch 132 is rotated clockwise or counter-clockwise the focus will sequentially move among only the anchor points of the phone number one by one at regular intervals of a predetermined rotation angle.

Now, a principle of realizing such an operation will be explained with reference to FIGS. 13A and 13B.

Figures 13A, 13B:
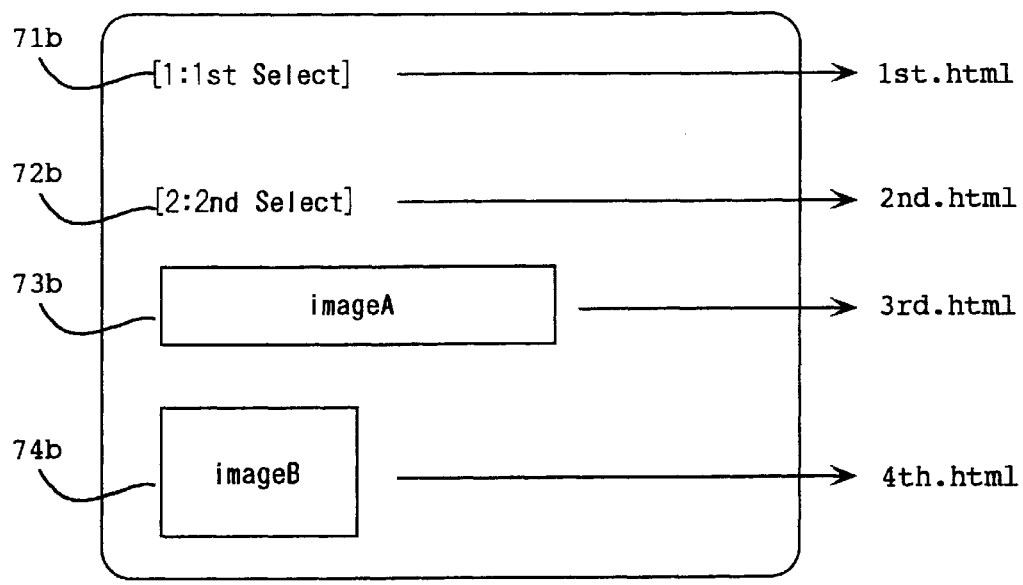
FIG. 13A shows a part of an exemplary description of an HTML document to which the present invention is applied.
FIG. 13B shows a browser image corresponding to the HTML document of FIG. 13A.

As shown in FIG. 13A, in the present embodiment, a special character string (here, "KEYSKIP") is included in each start tag of the anchor points that are to be skipped when the focus is moved in response to an operation for moving the focus. In response to such operation, the browser searches anchor points and sequentially moves the focus among them, in the written order. However, when the special character string has been found in the start tag of a given anchor point, the browser skips that anchor point.

Assume that an HTML document has a part including four anchor tags 71a–74a as shown in FIG. 13A. The two former anchor points are set to character strings, and the two latter anchor points are set to images. The linked destinations of the anchor points are other HTML files, i.e., 1st.html, 2nd.html, 3rd.html and 4th.html, respectively. The anchor tags 71a and 73a have the character string "KEYSKIP" added at the end in their start tags. This is an expansion of the function of HTML in the present embodiment. The special character string may be any character string other than "KEYSKIP". Browsers not adapted to the "KEYSKIP" attribute ignores the "KEYSKIP" command without exerting any affection to the browser operation.

The HTML document of FIG. 13A is seen as a browser image as shown in FIG. 13B. Now, assume that the anchor point 72b is focussed, that is, emphasized in display by changing the display attribute such colors, inversion, etc. Without the "KEYSKIP" attribute, the focus is moved sequentially from the anchor point 72b to 73b and to 74b in the written order of the HTML text, as in the prior art, in response to a user's operation to forwardly move the focus. This processing is realized in the embodiment by the focus moving means (i. e., CPU 101, browser, display controller, etc.) which changes the display data stored in the display memory. This change of the display data is realized by rewriting the content of the display memory. Alternatively, when a so-called color pallet (not shown) is employed, display colors can be changed only by changing the data in the pallet. The "change of the display data" in the specification includes such alternation of the display result by a process other than the rewriting the data itself in the display memory.

In the case where there are anchor points with the "KEYSKIP" attribute added as shown in FIG. 13A, such anchor points are skipped without being focussed when the focus is moved according to a user's operation due to the rotary push switch. In the example shown in FIG. 13B, when the focus is forwardly moved from the anchor point 72b the anchor point 73b is skipped and the focus will move onto the anchor point 74b. In the case of moving the focus backwardly, the anchor point 71b with the "KEYSKIP" attribute will be skipped.

Referring next to FIG. 14, a specific example of an HTML document is shown which corresponds to the personal information list of FIG. 7. In FIG. 14, the segments 91, 92, 93 and 94 define the person name, phone number, FAX number and e-mail address of the person at the first line in the personal information list of FIG. 7, respectively.

The segment 91 of the document, for defining the person name, is provided with a location #AndoIchiro of a file "contact.html" as a linked destination. When this anchor point is selected, the above-described screen 800 shown in FIG. 8 will be displayed which shows the detail of the personal information.

The segment 92 for the phone number includes a special command (or scheme), "phoneto: . . . ". When this anchor point is selected, by a user the browser uses the given phone number as a parameter to call a script (or program module) associated with the command. The execution of the script activates an automatic dialing to the given phone number.

The segment 93 for the FAX number includes a special command "faxto: . . .". In response to a selection of this anchor point by a user, the browser uses the given FAX number to call a script associated with this command. The execution of the script causes the screen 900 (FIG. 9) for sending a facsimile to the FAX number to be displayed for the above-described processing.

The segment 94 of the e-mail address includes a special command "mailto: . . ." which causes the screen 1000 (FIG. 10) to be opened for sending an e-mail. Also, in this case, when this anchor point is selected, a script associated with the command will be called so that the screen for sending an e-mail to the given e-mail address is displayed for the above-described processing.

Thus, the user cannot select, with the focus motion instructing means (rotary push switch 132), anchor points other than the phone numbers, that are added with the KEYSKIP" attribute. However, there may be no problem because only the telephone function is sufficient to use in the closed state of the cover 140.

Figure 15:
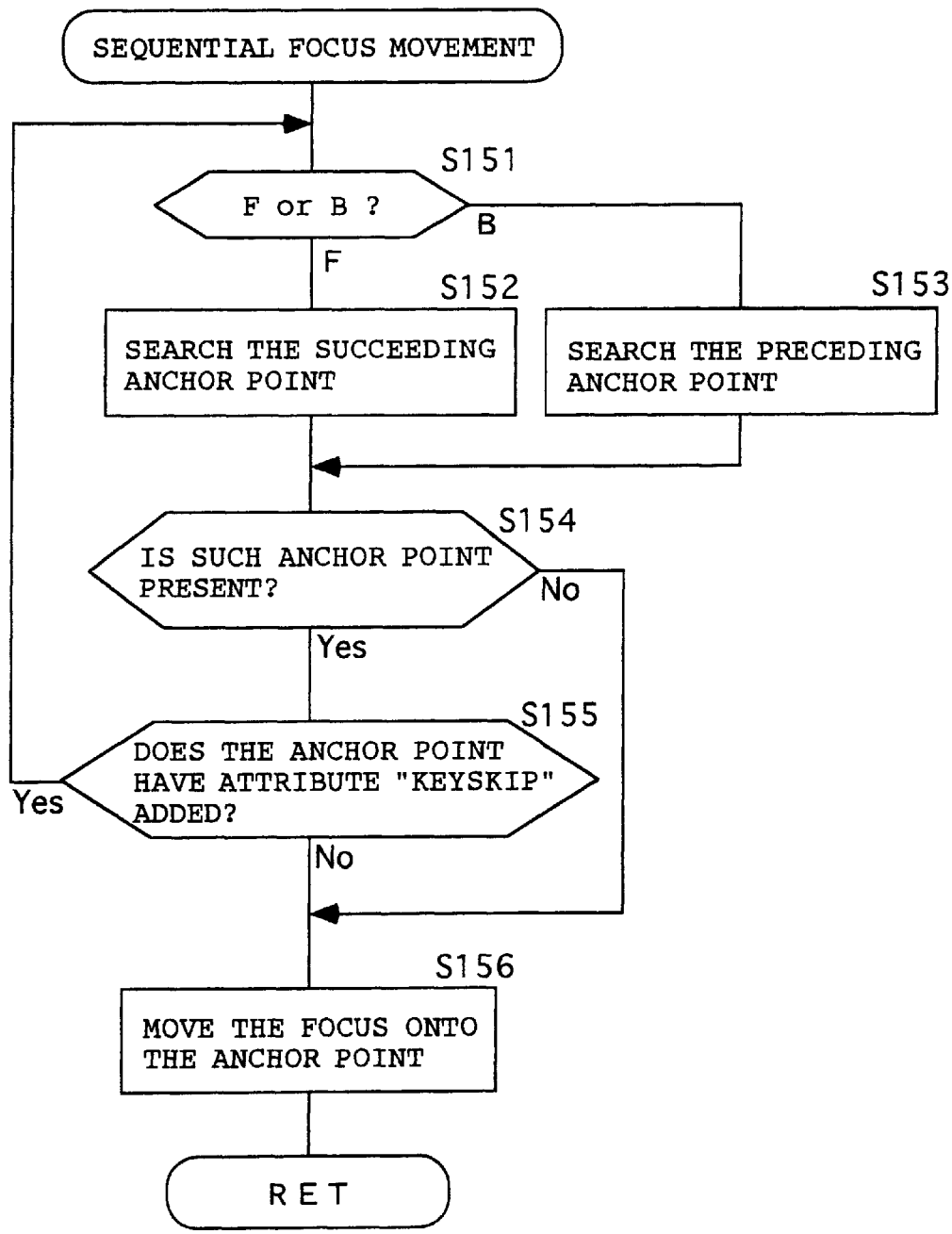
FIG. 15 is a flowchart showing exemplary processes which are carried out by a browser in response to a user's operation to move a focus among the anchor points.

Referring to FIG. 15, there is provided a flowchart showing a focus moving process which is executed by the CPU 101 in response to an operation to sequentially move the focus, in a browser adapted to the "KEYSKIP" attribute according to the invention. In response to a user's operation due to the rotary push switch 132, the browser first checks whether the operation indicates Forward "F" or Backward "B" movement (S151). The clockwise and counter-clockwise rotations of the rotary push switch correspond to the "Forward" and "Backward", respectively. If the "Forward" is indicated, an anchor point immediately succeeding the currently focussed anchor point is searched in the HTML document (S152). If the "Backward" is indicated, an anchor point immediately preceding the currently focussed anchor point is searched in the HTML document (S153). If no such anchor point is found (S154, No), the control will proceed to step S156. If such anchor point is found (S154, Yes), it is checked whether the"KEYSKIP" attribute is added to the anchor point (SI55). If such attribute is added, the control will go back to step 151 and the subsequent anchor point will be searched. If not, the focus is moved onto that anchor point (S156). At this time, if the anchor point to be focussed is in the display screen, the display is updated so as to show the part of the image that includes the anchor point. At the previous step S154, if no such anchor point is present, the focus is kept on the currently focussed anchor point (S156).

Incidentally, with the cover 140 opened in the device of FIG. 1, the user can access the Internet. For this end, by selecting a predetermined menu item or icon on the display, the user makes a dial-up connection to his or her provider. This allows the user to view desired home-pages.

Although the preferred embodiment of the invention has been described hereinbefore, various changes or modifications can be made without parting from the subject matter of the invention. For example, the anchor point for automatic dialing is set to the phone numbers in the above description, such anchor point may be set to a particular item such as person names or other items. In this case, the command "phoneto: . . . " is placed in the start tag of the segment 91 of the person name while its "KEYSKIP" is deleted. At the same time, the anchor tag in the segment 92 of the phone number is deleted.

According to the invention, in a mobile communication device capable of displaying an html document on a flat display of relatively large screen size, it is possible to quickly reach the anchor point of a target phone number by a focus moving operation with the rotary push switch, thereby enhancing operability of the device.

What is claimed is:

1. A mobile communication device, comprising:

a flat display;

a display means for displaying on said flat display a document including personal information in which an anchor point is set to a particular item of the personal information;

a switch capable of two-way retrieve operations as well as a push operation;

a focus moving means for sequentially moving, on said flat display, a focus among a plurality of anchor points in the document in a forward direction according to one of the retrieve operations of said switch and in a backward direction according to the other of the retrieve operations;

a selection means for selecting a currently-focussed one of said anchor points according to the push operation of said switch; and an attribute checking means for checking an anchor point that has a focus skipping attribute added from among said plurality of anchor points;

said focus moving means skipping anchor points that have focus skipping attribute, without focussing on those anchor points, when moving the focus among the anchor points in a forward or backward direction according to the retrieve operation of said switch.

2. The mobile communication device according to claim 1, wherein said focus skipping attribute is set to anchor points other than anchor points for automatic dialing.

3. The mobile communication device according to claim 1, further comprising an automatic dialing means for automatically making a phone call to a specified phone number when said anchor point for automatic dialing is selected by the push operation of said switch.

4. The mobile communication device according to claim 2, further comprising an automatic dialing means for automatically making a phone call to a specified phone number when said anchor point for automatic dialing is selected by the push operation of said switch.

5. The mobile communication device according to claim 1, further comprising:

a touch panel overlaid on the screen of said flat display; and a pointing means for pointing an arbitrary point on said touch panel;

wherein said anchor point selection means selects any anchor point that is pointed with said pointing means, even when the pointed anchor point is the anchor point having said focus skipping attribute added.

6. A mobile communication device, comprising:

a flat display;

a display means for displaying an HTML document including personal information in which an anchor point for automatic dialing is set to a particular item of the personal information;

a rotary push switch capable of clockwise and counter-clockwise rotating operations as well as a push operation;

a focus moving means for sequentially moving, on said flat display, a focus among a plurality of anchor points in the HTML document in a forward direction according to one of the clockwise and counter-clockwise rotating operations of the rotary push switch and in a backward direction according to the other;

a selection means for selecting a currently-focussed one of said anchor points according to the push operation of said rotary push switch; and an attribute checking means for checking an anchor point that has a focus skipping attribute added from among said plurality of anchor points;

said focus moving means skipping anchor points that have said focus skipping attribute, without focussing on those anchor points, when moving the focus among the anchor points in a forward or backward direction according to the clockwise or counter-clockwise rotating operation of said rotary push switch.

7. The mobile communication device according to claim 6, wherein said focus skipping attribute is set to anchor points other than said anchor points for automatic dialing.

8. The mobile communication device according to claim 6, further comprising an automatic dialing means for automatically making a phone call to a specified phone number when said anchor point for automatic dialing is selected by the push operation of said rotary push switch.

9. The mobile communication device according to claim 7, further comprising an automatic dialing means for automatically making a phone call to a specified phone number when said anchor point for automatic dialing is selected by the push operation of said rotary push switch.

10. The mobile communication device according to claim 6, further comprising:
   a touch panel overlaid on the screen of said flat display; and
   a pointing means for pointing an arbitrary point on said touch panel;
   wherein said anchor point selection means selects any anchor point that is pointed with said pointing means, even when the pointed anchor point is the anchor point having said focus skipping attribute added.

11. The mobile communication device according to claim 1, further comprising a cover which exposes, in its closed state, at least part of the screen of said flat display, wherein said display means displays at least said particular item within said display window when said cover is in its closed state.

12. The mobile communication device according to claim 6, further comprising a cover which exposes, in its closed state, at least part of the screen of said flat display, wherein said display means displays at least said particular item within said display window when said cover is in its closed state.

13. A mobile communication device, comprising:
   a flat display;
   a display means for displaying a document including personal information in which an anchor point is set to a particular item of the personal information;
   a switch capable of two-way retrieve operations as well as a push operation;
   a focus moving means for sequentially moving, on said flat display, a focus among a plurality of anchor points in the document in a forward direction according to one of the retrieve operations of said switch and in a backward direction according to the other of the retrieve operations;
   a selection means for selecting a currently-focussed one of said anchor points according to the push operation of said switch;
   said focus moving means skipping anchor points that have a focus skipping attribute added, without focussing on those anchor points, when moving the focus among the anchor points in a forward or backward direction according to the retrieve operation of said switch;
   a cover which exposes, in its closed state, at least part of the screen of said flat display, wherein said display means displays at least said particular item within said display window when said cover is in its closed state; and
   a detection means for detecting a closed/opened state of said cover, wherein said display means rotates by 90 degrees an image to be displayed of said flat display when the closed state of said cover is detected by said detection means.

14. A mobile communication device comprising:
   a flat display;
   a display means for displaying an HTML document including personal information in which an anchor point for automatic dialing is set to a particular item of the personal information;
   a rotary push switch capable of clockwise and counter-clockwise rotating operations as well as a push operation;
   a focus moving means for sequentially moving, on said flat display, a focus among a plurality of anchor points in the HTML document in a forward direction according to one of the clockwise and counter-clockwise rotating operations of the rotary push switch and in a backward direction according to the other;
   a selection means for selecting a currently-focussed one of said anchor points according to the push operation of said rotary push switch;
   said focus moving means skipping anchor points that have a focus skipping attribute added, without focussing on those anchor points, when moving the focus among the anchor points in a forward or backward direction according to the clockwise or counter-clockwise rotating operation of said rotary push switch;
   a cover which exposes, in its closed state, at least part of the screen of said flat display, wherein said display means displays at least said particular item within said display window when said cover is in its closed state; and
   a detection means for detecting a closed/opened state of said cover, wherein said display means rotates by 90 degrees an image to be displayed of said flat display when the closed state of said cover is detected by said detection means.

15. A method for moving a focus among a plurality of anchor points in a document which is displayed on a display of a mobile communication device, said document including personal information in which said anchor points are set at least to an item of the personal information, said device including a switch capable of two-way retrieve operations as well as a push operation, said method comprising the steps of:
   displaying said document on the display;
   sequentially moving, on said display, the focus among said plurality of anchor points in the document in a forward direction according to one of the retrieve operations of said switch and in a backward direction according to the other of the retrieve operations;
   selecting a currently-focussed one of said anchor points according to the push operation of said switch; and
   checking an anchor point that has a focus skipping attribute added from among said plurality of anchor points;
   said step of sequentially moving including a step of skipping anchor points that have said focus skipping attribute, without focussing on those anchor points, when moving the focus among the anchor points in a forward or backward direction according to the retrieve operation of said switch.

16. A method for moving a focus among a plurality of anchor points in an HTML document which is displayed on a display of a mobile communication device, said HTML document including personal information in which said anchor points for automatic dialing are set to a particular item of the personal information, said device including a rotary push switch capable of clockwise and counter-clockwise rotating operations as well as a push operation, said method comprising the steps of:
   displaying said HTML document on the display;
   sequentially moving, on said display, the focus among said plurality of anchor points in said HTML document in a forward direction according to one of the clockwise and counter-clockwise rotating operations of the rotary push switch and in a backward direction according to the other;

selecting a currently-focussed one of said anchor points according to the push operation of said rotary push switch; and checking an anchor point that has a focus skipping attribute added from among said plurality of anchor points;

said step of sequentially moving including a step of skipping anchor points that have said focus skipping attribute, without focussing on those anchor points, when moving the focus among the anchor points in a forward or backward direction according to the clockwise or counter-clockwise rotating operation of said rotary push switch.

* * * * *